US009142966B2

United States Patent
Lin et al.

(10) Patent No.: US 9,142,966 B2
(45) Date of Patent: Sep. 22, 2015

(54) METHOD FOR CONTROLLING A GRID-CONNECTED POWER SUPPLY SYSTEM

(75) Inventors: Yuchih Lin, Taipei (TW); Chong-Yu Huang, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 623 days.

(21) Appl. No.: 13/537,264

(22) Filed: Jun. 29, 2012

(65) Prior Publication Data

US 2014/0001867 A1 Jan. 2, 2014

(51) Int. Cl.
*H02J 3/38* (2006.01)

(52) U.S. Cl.
CPC ............... *H02J 3/383* (2013.01); *Y02E 10/563* (2013.01); *Y10T 307/696* (2015.04)

(58) Field of Classification Search
CPC ................................ H02J 3/383; Y02E 10/563
See application file for complete search history.

(56) References Cited

U.S. PATENT DOCUMENTS

| 2011/0089886 | A1* | 4/2011 | Dubovsky | 320/101 |
| 2011/0103118 | A1* | 5/2011 | Serpa et al. | 363/132 |
| 2011/0140438 | A1* | 6/2011 | Delmerico et al. | 290/55 |
| 2011/0232714 | A1* | 9/2011 | Bhavaraju et al. | 136/244 |

FOREIGN PATENT DOCUMENTS

JP 2009247184 A * 10/2009

* cited by examiner

*Primary Examiner* — Jared Fureman
*Assistant Examiner* — Brett Squires
(74) *Attorney, Agent, or Firm* — Rosenberg, Klein & Lee

(57) ABSTRACT

A method for controlling a grid-connected power supply system having multiple power supply modules, a relay commonly connected to output terminals of the power supply modules and connected between the power supply modules and a mains power grid, and a controller controlling each power supply module and the relay. The method is performed by the controller after the grid-connected power supply system is started and has steps of determining if each power supply module outputs power, activating each power supply module and charging an energy storage capacitor of the power supply module, and activating the relay when the stored voltages of the energy storage capacitors of all the power supply modules are greater than a preset peak voltage of the mains power. Accordingly, required number of relays is reduced and the size of the system can thus be more compact.

21 Claims, 5 Drawing Sheets

METHOD FOR CONTROLLING A GRID-CONNECTED POWER SUPPLY SYSTEM

BACKGROUND OF THE INVENTION

1. Field of the Invention

The present invention relates to a grid-connected power supply system and more particularly to a method for controlling a grid-connected power supply system.

2. Description of the Related Art

The increasing use of energy since industrial revolution has brought with it the concern of global energy depletion that human beings have to encounter sooner or later. Looking for alternative energy has become a worldwide urgent matter for mankind to keep developing for now and in the future. Generating electricity from solar energy to supply power to electric appliances is a rather commonplace technique currently.

Suppliers of conventional grid-connected power supply system have begun to incorporate converted alternative energy, such as wind energy, solar energy and the like, with the utility grid to reduce the mains power consumption. With reference to FIG. 4, a conventional grid-connected power supply system has a first power supply module 80 and a second power supply module 90. The first power supply module and the second power supply module absorb solar energy and convert it into electricity through two respective solar panels 81, 91. Electricity is further converted into DC power by two DC to DC converters 82, 92 and two rectifiers 83, 93 to store the DC power in two energy storage capacitors C11, C22. After a stored voltage Vbus1 or Vbus2 of the energy storage capacitor C11, C22 is greater than the voltage of the post-end mains power, a relay 70 closes and DC power outputted from the rectifiers 83, 93 is converted into AC power through two DC to AC converters 84, 94 and then outputted to the output capacitors C1 and C2 and further to the mains power grid. Hence, the regenerative energy, such as solar energy, wind energy and the like, is converted into electricity, which is further converted into AC power and outputted to the mains power grid, so as to reduce mains power consumption.

However, when one of the solar panels 81, 91 fails to supply solar energy to the first and second power supply modules 80, 90 and the stored voltage Vbus1, Vbus2 of the energy storage capacitors C11, C12 is less than a peak voltage value of the mains power, the voltage of the mains power charges the energy storage capacitors C11, C12 through a body diode of each metal oxide semiconductor field effect transistor (MOSFET) inside the DC to AC converters 84, 94. A surge current is generated during the charge-back process to pass through the body diode of each MOSFET and discharge huge power heating up or even burning out the body diode of each MOSFET. To prevent the mains power from charging the energy storage capacitors C11, C12, with reference to FIG. 5, a relay 85, 95 is usually connected to an output terminal of each of the first and second power supply modules 80, 90 to ensure that each of the first and second power supply modules 80, 90 is isolated from the mains power to avoid further damaging the DC to AC converters 84, 94.

Although the approach connecting the relay to each of the first and second power supply modules 80, 90 indeed isolates each of the first and second power supply modules 80, 90 and further prevents the DC to AC converter 84, 94 inside each of the first and second power supply modules 80, 90 from being burned out, the relay is costly and occupies more space due to its bulky size. In the case of a power supply system having multiple sets of power supply modules, the cost and size issues even aggravate.

SUMMARY OF THE INVENTION

An objective of the present invention is to provide a method for controlling a grid-connected power supply system having a more compact size and lower cost.

To achieve the foregoing objective, the grid-connected power supply system has multiple power supply modules, a relay and a controller.

Each power supply module has an input terminal, an output terminal, a regenerative energy converter, a DC to DC converter, a DC to AC converter, an output circuit, an input capacitor and an energy storage capacitor.

The regenerative energy converter, the DC to DC converter, the DC to AC converter and the output circuit are sequentially connected between the input terminal and the output terminal of the power supply module. The DC to AC converter has multiple MOSFETs.

The input capacitor is parallelly connected between the regenerative energy converter and the DC to DC converter.

The energy storage capacitor is parallelly connected between the DC to DC converter and the DC to AC converter. The MOSFETs of the DC to AC converter are connected between the energy storage capacitor and the output circuit.

The relay is parallelly connected between the output terminal of each power supply module and a mains power grid.

The controller controls the power supply modules and the relay.

The method is performed by the controller and has steps of:

determining if the regenerative energy converter of each power supply module outputs power;

activating each power supply module having the regenerative energy converter outputting power so that the DC to DC converter of the power supply module charges the energy storage capacitor of the power supply module and a stored voltage of the energy storage capacitor is outputted to the DC to AC converter and is converted into AC power and outputted to the output circuit by the DC to AC converter;

determining if the stored voltage of the energy storage capacitor of each power supply module is greater than a preset peak voltage of the mains power, and resuming the current step if not the stored voltages of the energy storage capacitors of all the power supply modules are greater than the preset peak voltage of the mains power; and activating the relay when the stored voltages of the energy storage capacitors of all the power supply modules are greater than the preset peak voltage of the mains power.

When one of the power supply modules fails and the stored voltage of the energy storage capacitor is unable to reach the preset peak voltage of the mains power, each operating power supply module not only charges the energy storage capacitor but also converts the stored voltage of the energy storage capacitor using the DC to AC converter and outputs the converted AC power to the output circuit. As the output circuits of the power supply modules are parallelly connected, the converted AC power is also outputted to the output circuit of each non-operating power supply module. The body diodes of the MOSFETs of the DC to AC converter of each non-operating power supply module further rectify the converted AC power sent from the output circuit of the non-operating power supply module to DC power to charge the energy storage capacitor of the non-operating power supply module. When the stored voltages of all the power supply modules are higher than the preset peak voltage of the mains power, the relay is activated to connect with the mains power grid. Given the foregoing method, it is unnecessary for each power supply module to be connected with a relay. Therefore, required number of relays is reduced and the size of the system can thus be more compact.

Other objectives, advantages and novel features of the invention will become more apparent from the following detailed description when taken in conjunction with the accompanying drawings.

DETAILED DESCRIPTION OF THE INVENTION

Figure 1:
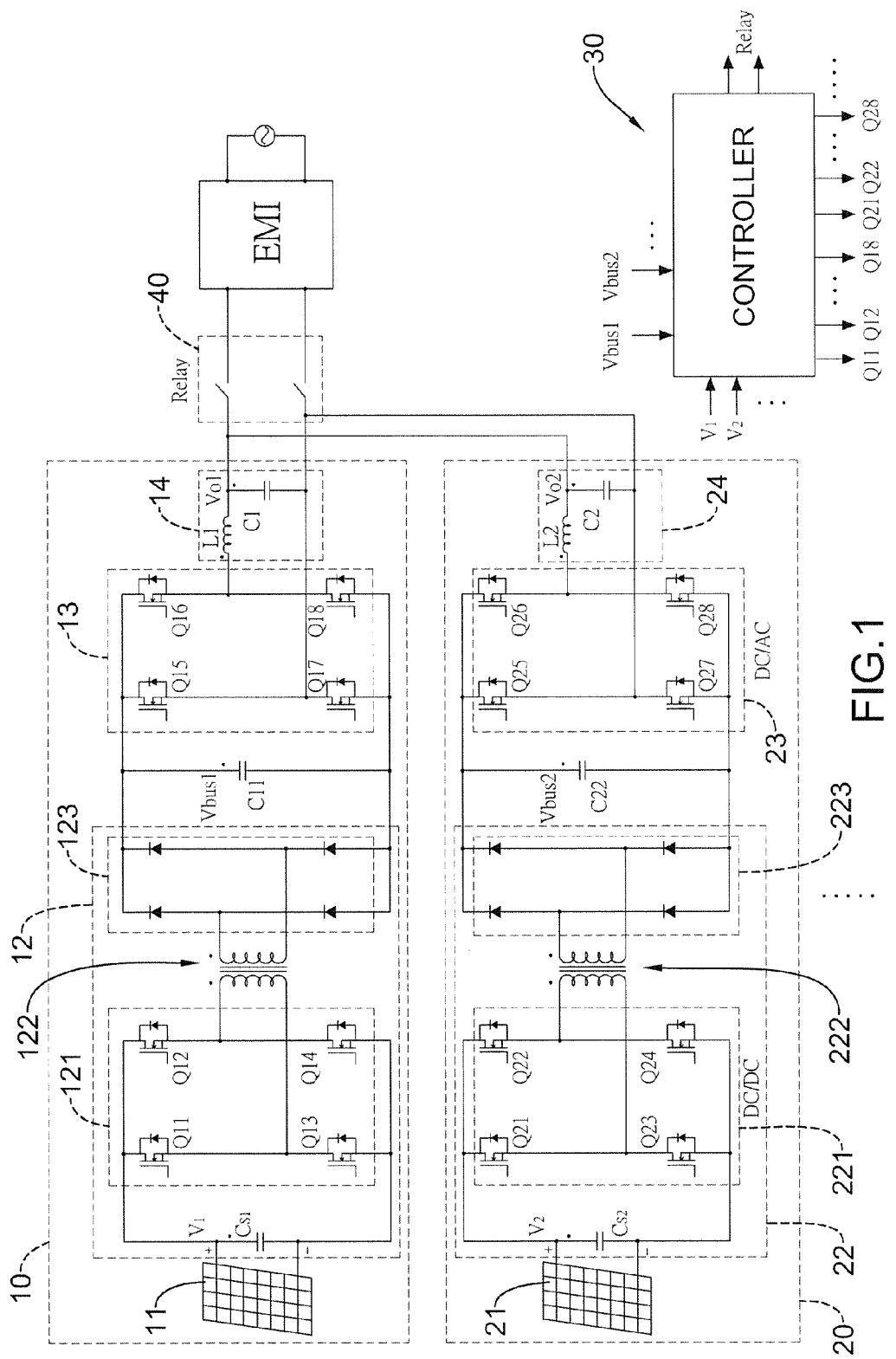
FIG. 1 is a circuit diagram of a grid-connected power supply system in accordance with the present invention.

With reference to FIG. 1, a grid-connected power supply system in accordance with the present invention has multiple power supply modules 10, 20, a relay 40 and a controller 30. Each power supply module 10, 20 has an input terminal and an output terminal. The relay 40 is parallelly connected to the output terminal of each power supply module 10, 20 and is connected between each of the power supply module 10, 20 and a mains power grid. The controller 30 controls the power supply modules 10, 20 and the relay 40. In the present embodiment, the controller 30 has multiple input terminals and multiple output terminals, the relay 40 has an input terminal, an output terminal and a pair of switches therein, and the grid-connected power supply system has a first power supply module 10 and a second power supply module 20. Each of the power supply modules 10, 20 has an input terminal, an output terminal, a regenerative energy converter 11, 21, a DC to DC converter 12, 22, a DC to AC converter 13, 23 and an output circuit 14, 24, and the regenerative energy converter 11, 21, the DC to DC converter 12, 22, the DC to AC converter 13, 23 and the output circuit 14, 24 are sequentially connected between the input terminal and the output terminal. In the present embodiment, the DC to DC converter 12, 22 has a converter 121, 221, a transformer 122, 222 and a rectifier 123, 223 sequentially connected between the input terminal of a corresponding power supply module 10, 20 and the DC to AC converter 13, 23. The DC to DC converter 12, 22 further has an input capacitor Cs1, Cs2 parallelly connected between the converter 121, 221 and the input terminal of a corresponding power supply module 10, 20.

The regenerative energy converter 11, 21 has an input terminal and an output terminal, converts an energy source connected to the input terminal into DC power, and outputs the DC power to the post DC to DC converter 12, 22 through the output terminal thereof. The regenerative energy converter 11, 21 may be a wind turbine, a solar cell or the like. In the present embodiment, the regenerative energy converter 11, 21 is a solar cell.

The DC to DC converter 12, 22 has an input terminal and an output terminal, and the input terminal is connected to the output terminal of the regenerative energy converter 11, 21 to convert the DC power outputted from the regenerative energy converter 11, 21 into a stable DC operating voltage outputted from the output terminal thereof.

The input capacitor Cs1, Cs2 generates an input voltage V1, V2 with the DC power outputted from the regenerative energy converter 11, 21 and outputs the input voltage V1, V2 to the converter 121, 221. The input voltage V1, V2 is detected by the controller 30.

The converter 121, 221 has an input terminal and an output terminal. The input terminal of the converter 121, 221 is parallelly connected to the input capacitor Cs1, Cs2 and is connected to the input terminal of the DC to DC converter 12, 22. The converter 121, 221 first converts the input voltage V1, V2 into a first high-frequency AC operating voltage and then outputs the first AC operating voltage through the output terminal thereof.

The transformer 122, 222 has a primary side and a secondary side. The first AC operating voltage is inputted to the primary side of the transformer 122, 222 connected to the output terminal of the converter 121, 221. The first AC operating voltage is converted into a second high-frequency AC operating voltage and outputted through a secondary side of the transformer 122, 222.

The rectifier 123, 223 has an input terminal and an output terminal, and the input terminal is connected to the secondary side of the transformer 122, 222. The second high-frequency AC operating voltage is inputted to the input terminal of the rectifier 123, 223 and is converted by the rectifier 123, 223 into a stable DC operating voltage. In the present embodiment, the rectifier 123, 223 is a bridge rectifier.

The DC to DC converter may be a multiple-output isolated type or a non-isolated type. The types of the converter 121, 221 and the rectifier 123, 223 are not limited specifically and may be a full-bridge type or a half-bridge type or a boost type or a buck type. In the present embodiment, the DC to DC converter is a multiple-output isolated type and has four MOSFETs, and the gate of each MOSFET is connected to one of the output terminals of the controller 30 and is controlled by the controller 30.

The DC to AC converter 13, 23 has an input terminal and an output terminal, and the input terminal is connected to the output terminal of the rectifier 123, 223 to convert the DC operating voltage into AC power and output the AC power. The DC to AC converter 13, 23 may be a multiple-output isolated type or a non-isolated type. The type of the DC to AC converter is not limited specifically and may be a full-bridge type or a half-bridge type. In the present embodiment, the DC to AC converter 13, 23 is a multiple-output isolated type and has four MOSFETS. The gate of each MOSFET is connected to one of the output terminals of the controller 30 and is controlled by the controller 30.

The output circuit 14, 24 has an input terminal, an output terminal, an output inductor L1, L2 and an output capacitor C1, C2. The input terminal of the output circuit 14, 24 is connected to the output terminal of the DC to AC converter 13, 23. The output terminal of the output circuit 14, 24 is connected to the output terminal of a corresponding power supply module 10, 20. The output inductor L1, L2 is serially connected between the input terminal and the output terminal of the output circuit 14, 24. The output capacitor C1, C2 is parallelly connected between the input terminal and the output terminal of the output circuit 14, 24. The two output capacitors C1, C2 are parallelly connected to an input terminal of the input terminal of the relay 40. The output inductor L1, L2 and the output capacitor C1, C2 are combined to form a filter for the output circuit 14, 24 to output AC voltage having a particular frequency. The output circuit 14, 24 also targets at generating an output voltage from the capacitor C1, C2 with the AC operating voltage outputted from the DC to AC converter 13, 23.

Each power supply module 10, 20 further has an energy storage capacitor C11, C22 parallelly connected between the DC to DC converter 12, 22 and the DC to AC converter 13, 23.

The controller 30 has multiple input terminals and multiple output terminals. The input terminals of the controller 30 are connected to each input capacitor Cs1, Cs2 and each energy storage capacitor C11, C22 to acquire the respective voltage value thereof. A portion of the output terminals of the controller 30 are respectively connected to the gates of the MOSFETs Q11, Q12, Q13, Q14, Q22, Q21, Q23, Q24 of the DC to DC converter and the gates of the MOSFETs Q15, Q16, Q17, Q18, Q25, Q26, Q27, Q28 of the DC to AC converter for the controller 30 to turn on or off each MOSFET of the DC to DC converter and the DC to AC converter. Two of the output terminals of the controller 30 are connected to the pair of switches of the relay 40 for the controller 30 to switch on or off the pair of switches of the relay 40.

Figure 2:
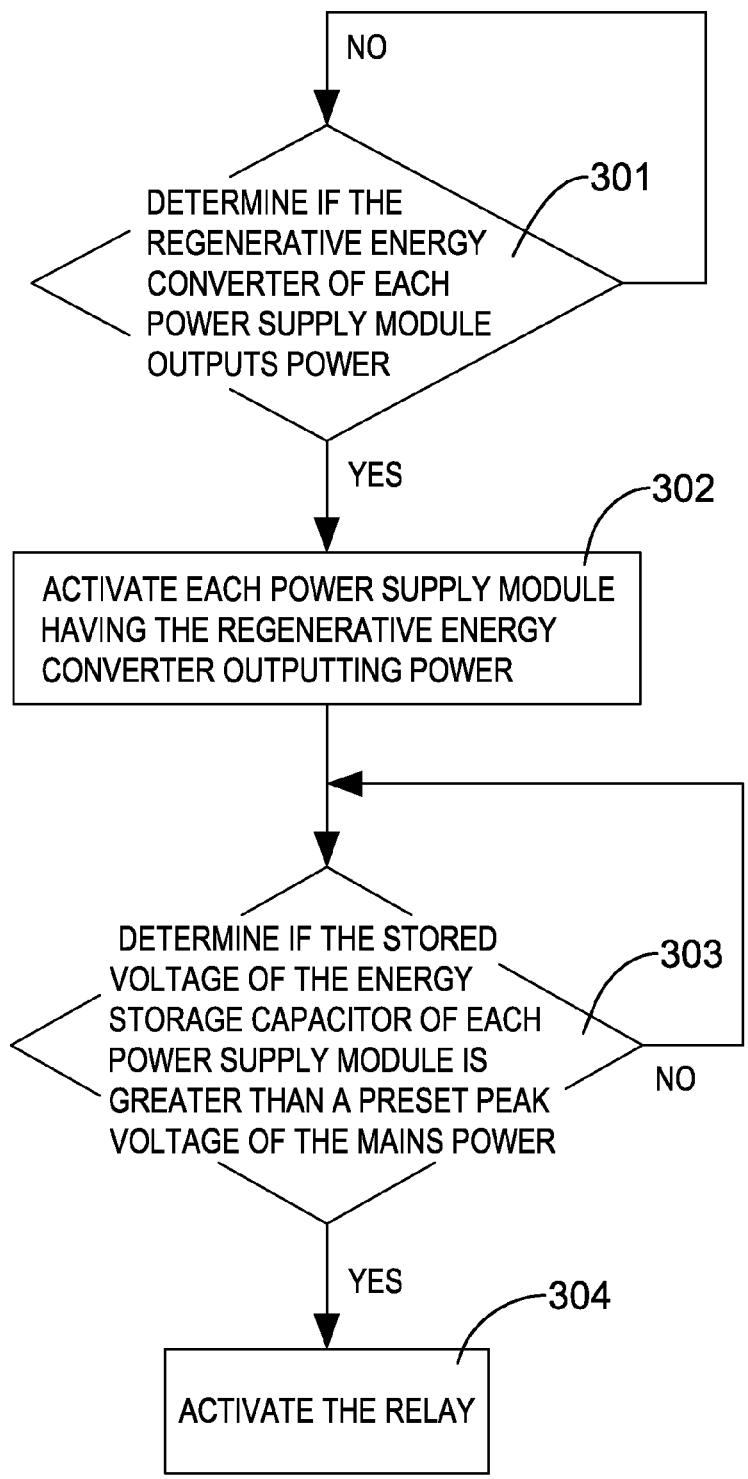
FIG. 2 is a flow diagram of a method performed by a controller of the grid-connected power supply system in FIG. 1.

With reference to FIG. 2, after the grid-connected power supply system is started, a method for controlling a grid-connected power supply system is performed by the controller and has the following steps.

Step 301: Determine if the regenerative energy converter of each power supply module outputs power.

Step 302: Activate each power supply module having the regenerative energy converter outputting power so that the DC to DC converter of the power supply module charges the energy storage capacitor of the power supply module and a stored voltage of the energy storage capacitor is outputted to the DC to AC converter and is converted into AC power and outputted to the output circuit by the DC to AC converter.

Step 303: Determine if the stored voltage of the energy storage capacitor of each power supply module is greater than a preset peak voltage of the mains power, and resume the current step if not the voltages of the energy storage capacitors of all the power supply modules are greater than the preset peak voltage of the mains power.

Step 304: Activate the relay when the voltages of the energy storage capacitors of all the power supply modules are greater than the preset peak voltage of the mains power.

Figure 3:
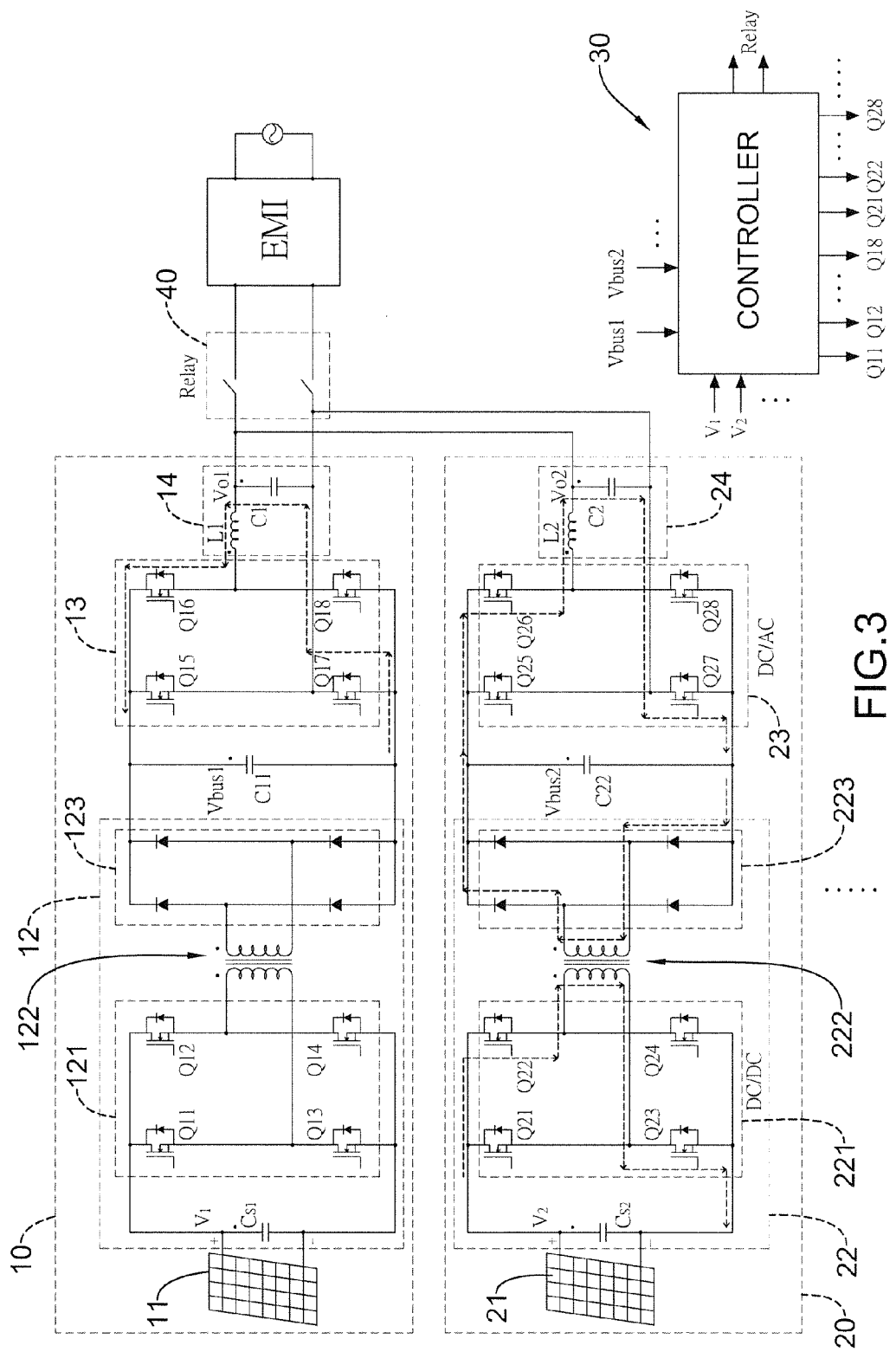
FIG. 3 is an operational circuit diagram of the grid-connected power supply system in FIG. 1 when charging an energy storage capacitor.
Figure 4:
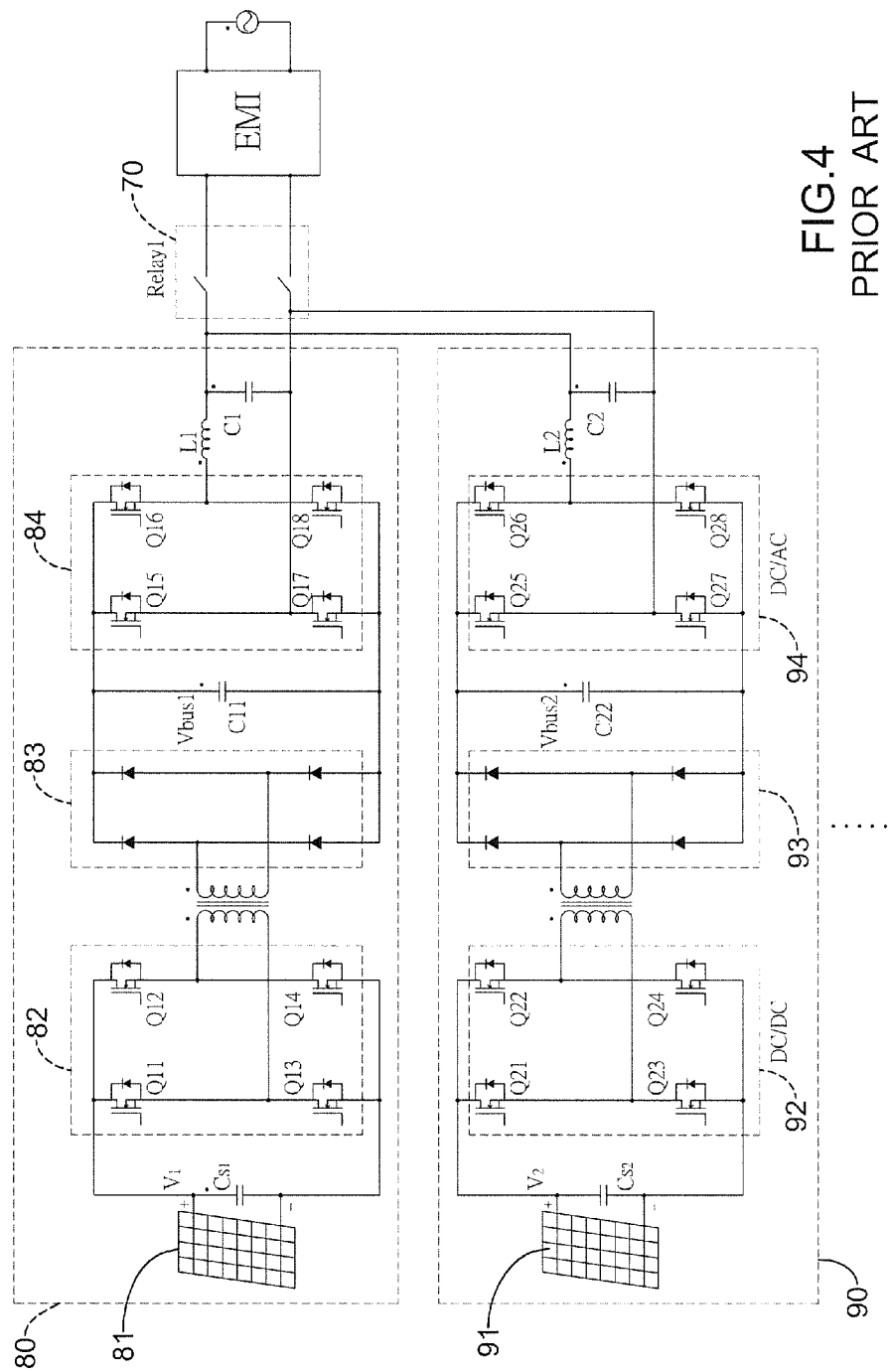
FIG. 4 is a circuit diagram of a conventional grid-connected power system.
Figure 5:
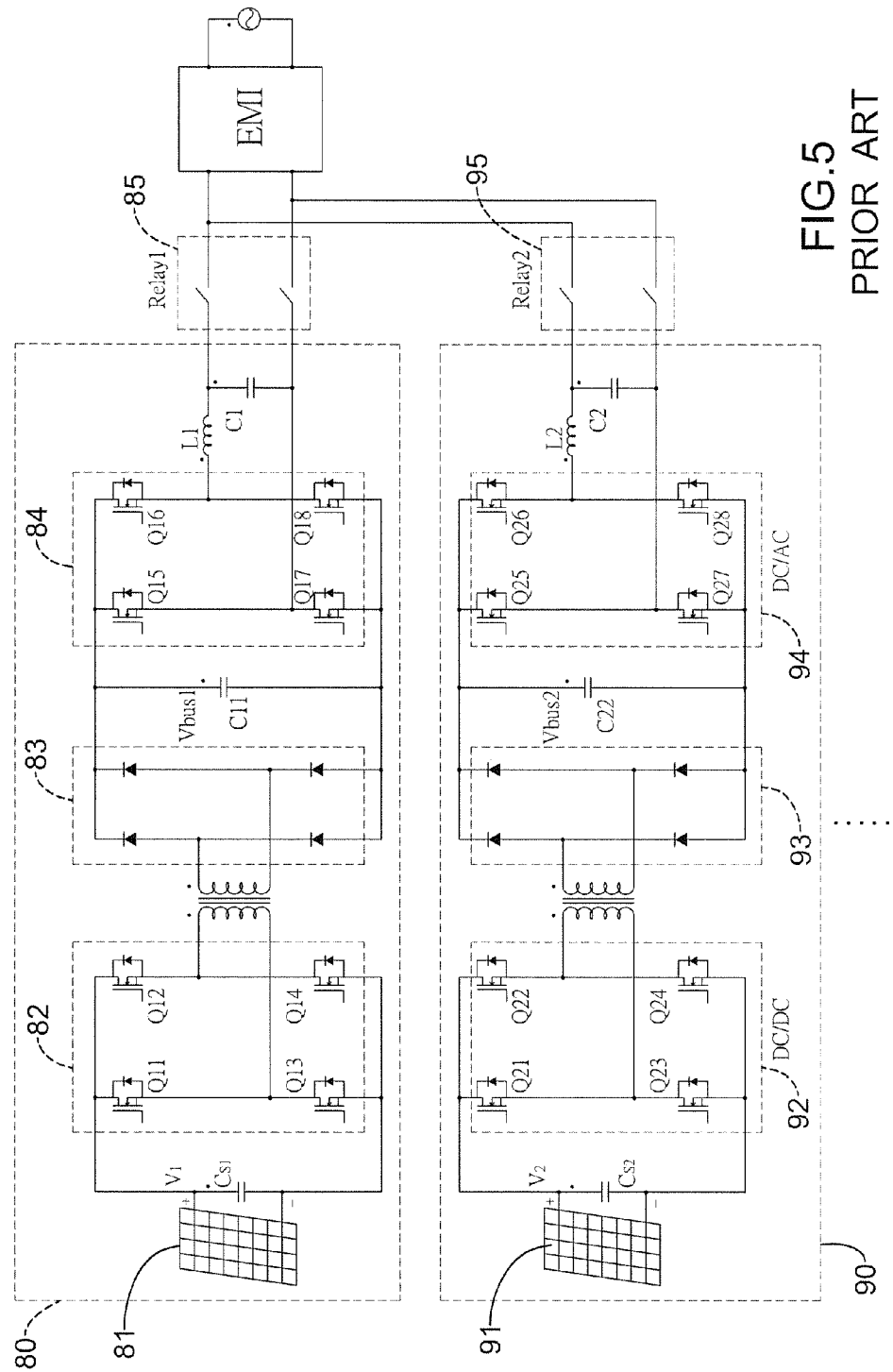
FIG. 5 is a circuit diagram of another conventional grid-connected power supply system.

When the grid-connected power supply system is operated, the controller 30 drives each power supply module 10, 20 whose DC to DC converter 12, 22 has the input voltage V1, V2 so that the input voltage V1, V2 goes through the DC to DC converter 12, 22, the transformer 122, 222 and the rectifier 123, 223 to charge the energy storage capacitor C11, C22 in generation of the stored voltage Vbus1, Vbus2. The controller further determines if the stored voltage is greater than the peak voltage of the mains power, and if positive, activates the relay 40 to connect with the mains power grid and drives the DC to AC converter 13, 23 to output the stored voltage Vbus1, Vbus2 to the output circuit 14, 24. If one of the power supply modules 10, 20 fails, with reference to FIG. 3, the regenerative energy converter 21 of the second power supply module 20 acquires energy and generates the input voltage V2 at the input capacitor Cs2. Due to the acquisition of the input voltage V2, the controller 30 activates the DC to DC converter 22 to charge the energy storage capacitor C22 through the transformer 222 and the rectifier 223 until the stored voltage Vbus2 of the energy storage capacitor C22 is greater than the peak voltage of the mains power. The controller 30 then activates the DC to AC converter 23 to further output the stored voltage to the output circuit 24 and generate an output voltage Vo2 at the output capacitor C2. As the controller 30 detects that the stored voltage Vbus1 of the energy storage capacitor C11 of the first power supply module 10 is less than the peak voltage of the mains power, the relay 40 is not activated. Meanwhile, as the output capacitor C2 of the output circuit 24 of the second power supply module 20 is parallelly connected to the output capacitor C1 of the first power supply module 10, the output voltage Vo2 of the output capacitor C2 is outputted to the output capacitor C1 to generate a corresponding output voltage Vo1. The body diode of each MOSFET Q15, Q16, Q17, Q18 inside the DC to AC converter 13 further rectifies the output voltage Vo1 to DC power to charge the energy storage capacitor C11. After the stored voltage Vbus1 of the energy storage capacitor C11 and the stored voltage Vbus2 of the energy storage capacitor C22 are all greater than the peak voltage of the mains power, the controller 30 then activates the relay 40 to connect with the mains power grid. Given the foregoing method, the DC to AC converter is not charged back and damaged by a surge of the mains power, and no relay is required to be added to the output terminal of each power supply module for mutual isolation. Accordingly, the number of relays can be reduced and miniaturization of the grid-connected system is achievable, thereby increasing the competitive edge in the market of grid-connected systems.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for controlling a grid-connected power supply system, wherein the grid-connected power supply system has:
    multiple power supply modules, each power supply module having:
        an input terminal;
        an output terminal;
        a regenerative energy converter converting energy from an energy source into a DC (Direct Current) power and having:
            an output terminal connected to the input terminal of the power supply module; and
            the output terminal outputting the DC power;
        a DC to DC converter converting the DC power outputted from the regenerative energy converter into a DC operating voltage and having:
            an input terminal connected to the output terminal of the regenerative energy converter;
            an output terminal outputting the DC operating voltage; and
            an input capacitor parallelly connected between the input terminal and the output terminal of the DC to DC converter;
        a DC to AC (Alternating Current) converter converting the DC operating voltage into an AC power and having:
            multiple metal oxide semiconductor field effect transistors MOSFETs);
            an input terminal connected to the output terminal of the DC to DC converter; and
            an output terminal outputting the AC power;
        an output circuit generating an output voltage and having:
            an input terminal connected to the output terminal of the DC to AC converter;

an output terminal connected to the output terminal of the power supply module and outputting the output voltage; and an output capacitor parallelly connected between the input terminal and the output terminal of the output circuit, and connected to the output capacitor of the output circuit of another one of the multiple power supply modules next to the power supply module; and an energy storage capacitor parallelly connected between the output terminal of the DC to DC converter and the input terminal of the DC to AC converter, wherein the MOSFETs of the DC to AC converter are connected between the energy storage capacitor and the output circuit;

a relay parallelly connected between the output terminal of each power supply module and a mains power grid and having an input terminal parallelly connected to the output capacitor of each power supply module; and a controller connected to the input capacitor and the energy storage capacitor of each power supply module and controlling the power supply modules and the relay;

the method performed by the controller and comprising steps of:

determining if the regenerative energy converter of each power supply module outputs power;

activating each power supply module having the regenerative energy converter outputting power so that the DC to DC converter of the power supply module charges the energy storage capacitor of the power supply module and a stored voltage of the energy storage capacitor is outputted to the DC to AC converter and is converted into AC power and outputted to the output circuit by the DC to AC converter;

activating the DC to DC converter of one of the activated power supply modules next to any power supply module outputting no power to charge the energy storage capacitor of the power supply module outputting no power until the stored voltage of the energy storage capacitor of the power supply module outputting no power is greater than a preset peak voltage of the mains power;

determining if the stored voltage of the energy storage capacitor of each power supply module is greater than the preset peak voltage of the mains power, and resuming the current step if not when the condition that the stored voltage of the energy storage capacitor of each power supply module is greater than the preset peak voltage of the mains power is not met; and activating the relay when the stored voltages of the energy storage capacitors of all the power supply modules are greater than the preset peak voltage of the mains power.

2. The method as claimed in claim 1, wherein the regenerative energy converter is a wind turbine.

3. The method as claimed in claim 2, wherein the DC to DC converter is a multiple-output isolated DC to DC converter.

4. The method as claimed in claim 2, wherein the DC to DC converter is a multiple-output non-isolated DC to DC converter.

5. The method as claimed in claim 2, wherein the DC to DC converter is a full-bridge DC to DC converter.

6. The method as claimed in claim 2, wherein the DC to DC converter is a half-bridge DC to DC converter.

7. The method as claimed in claim 2, wherein the DC to DC converter is a boost DC to DC converter.

8. The method as claimed in claim 2, wherein the DC to DC converter is a buck DC to DC converter.

9. The method as claimed in claim 1, wherein the regenerative energy converter is a solar cell.

10. The method as claimed in claim 9, wherein the DC to DC converter is a multiple-output isolated DC to DC converter.

11. The method as claimed in claim 9, wherein the DC to DC converter is a multiple-output non-isolated DC to DC converter.

12. The method as claimed in claim 9, wherein the DC to DC converter is a full-bridge DC to DC converter.

13. The method as claimed in claim 9, wherein the DC to DC converter is a half-bridge DC to DC converter.

14. The method as claimed in claim 9, wherein the DC to DC converter is a boost DC to DC converter.

15. The method as claimed in claim 9, wherein the DC to DC converter is a buck DC to DC converter.

16. The method as claimed in claim 1, wherein the DC to DC converter is a multiple-output isolated DC to DC converter.

17. The method as claimed in claim 1, wherein the DC to DC converter is a multiple-output non-isolated DC to DC converter.

18. The method as claimed in claim 1, wherein the DC to DC converter is a full-bridge DC to DC converter.

19. The method as claimed in claim 1, wherein the DC to DC converter is a half-bridge DC to DC converter.

20. The method as claimed in claim 1, wherein the DC to DC converter is a boost DC to DC converter.

21. The method as claimed in claim 1, wherein the DC to DC converter is a buck DC to DC converter.

\* \* \* \* \*